United States Patent
Yokoyama et al.

(10) Patent No.: US 9,273,216 B2
(45) Date of Patent: Mar. 1, 2016

(54) SOLVENT BORNE COATING COMPOSITION HAVING IMPROVED BRUSHABILITY AND PROCESS FOR PRODUCING COATINGS THEREFROM

(71) Applicant: AXALTA COATING SYSTEMS IP CO., LLC, Wilmington, DE (US)

(72) Inventors: Ayumu Yokoyama, Wallingford, PA (US); Kenneth A. McDiarmid, Oak Hills, CA (US); Ross Sydney Morgan, Avondale, PA (US); Rajesh Gopalan Saliya, Wilmington, DE (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 47 days.

(21) Appl. No.: 14/200,997

(22) Filed: Mar. 7, 2014

(65) Prior Publication Data

US 2015/0037504 A1 Feb. 5, 2015

Related U.S. Application Data

(60) Provisional application No. 61/774,836, filed on Mar. 8, 2013.

(51) Int. Cl.
| | |
|---|---|
| *B05D 1/28* | (2006.01) |
| *C08L 91/00* | (2006.01) |
| *C09D 7/12* | (2006.01) |
| *C08K 5/09* | (2006.01) |
| *B05D 3/00* | (2006.01) |
| *B05D 7/14* | (2006.01) |

(52) U.S. Cl.
CPC .............. *C09D 7/1233* (2013.01); *B05D 3/007* (2013.01); *C08K 5/09* (2013.01); *B05D 1/28* (2013.01); *B05D 7/14* (2013.01)

(58) Field of Classification Search
CPC .................................................. C09D 191/005
See application file for complete search history.

(56) References Cited

U.S. PATENT DOCUMENTS

| | | | |
|---|---|---|---|
| 6,896,877 B2 | 5/2005 | Calello et al. | |
| 2006/0167167 A1* | 7/2006 | Ooba | C08G 18/10 524/495 |

OTHER PUBLICATIONS

Machine Translation of JP 2000-178334 A to Sakae et al.*

* cited by examiner

*Primary Examiner* — Vu A Nguyen

(74) *Attorney, Agent, or Firm* — Ingrassia Fisher & Lorenz, P.C.

(57) ABSTRACT

A solvent borne brushable coating composition and process for using the same are provided. The composition includes a crosslinkable component having one or more polymers having two or more crosslinkable groups a crosslinking component comprising one or more crosslinking agents having crosslinking groups; and 2 weight percent to 50 weight percent of drying oil comprising linseed oil, tung oil, poppy seed oil, perilla oil, walnut oil or a combination thereof. When a layer a pot mix resulting from mixing of the crosslinkable and crosslinking components is brush applied over a substrate, it has a low brush drag while providing desired coating properties, such as high gloss and rapid cure even under ambient conditions. The solvent borne brushable coating compositions is well suited for use in automotive refinish applications.

15 Claims, No Drawings

SOLVENT BORNE COATING COMPOSITION HAVING IMPROVED BRUSHABILITY AND PROCESS FOR PRODUCING COATINGS THEREFROM

CROSS-REFERENCE TO RELATED APPLICATION

This application claims the benefit of U.S. Provisional Application No. 61/774,836, filed Mar. 8, 2013, which is incorporated herein by reference in its entirety.

TECHNICAL FIELD

The technical field is directed to a solvent borne coating composition having improved brushability and more particularly directed to solvent borne automotive brushable paint having low VOC that produce high gloss coatings on automotive bodies.

BACKGROUND

Brushability is the ability of paint to be easily and uniformly applied to a surface using a paint brush. Brushability is adversely affected as a result of brushmarks (striations) that do not flow out, sagging, high brush drag that makes brushing difficult, and low brush drag that makes brushing so easy that overspreading of the paint occurs. Other defects such as cratering or uneven coating thickness can also occur. Lap marks will occur if the paint formulation or the way that it is being applied will not allow a wet edge to be maintained, i.e., there would be a difference in the gloss between dried layer and next abutting wet layer being brushed. Brush drag, a measure of the ease or difficulty of the brushing action, is a major factor in brushability. High brush drag helps produce high film thickness, but can make brushing so difficult that the painter can easily get tired of applying paint. Low brush drag means that the paint may be easy to apply, but then would result in a thin uneven coating with poor hiding. The brushability of two-pack cure coating compositions, i.e., enamels, is even more difficult to achieve since it is difficult to control premature curing of a pot mix on paint bristles as well as different parts of bristles containing pot mix that have been exposed to the paint. Thus, a need still exists for a brushable solvent borne ambient cure enamel that has low brush drag and low VOC but still provides desired coating properties, such as high gloss.

In the past, Kaolin has been used to improve the brushability of two pack coating compositions, such as enamels. However, the presence of Kaolin could affect the coating properties of a coating when exposed to environmental damage such as abrasion from dirt and grime on the road and cracking.

Thus, a need exist to improve the brushability of a coating composition without the loss of any gloss of a coating resulting therefrom, especially for ambient cure automotive paint used in refinish applications. In addition, other objects, desirable features and characteristics will become apparent from the subsequent summary and detailed description, and the appended claims, taken in conjunction with the accompanying drawings and this background.

SUMMARY

This invention is directed to a solvent borne brushable coating composition. In the following thirteen embodiments are listed:

1. A solvent borne brushable coating composition comprising:
   (a) a crosslinkable component comprising one or more polymers having two or more crosslinkable groups;
   (b) a crosslinking component comprising one or more crosslinking agents having crosslinking groups; and
   (c) about 2 weight percent to about 50 weight percent of drying oil comprising linseed oil, tung oil, poppy seed oil, perilla oil, walnut oil or a combination thereof added to said crosslinkable component, crosslinking component, or to said crosslinkable and crosslinking components, said weight percentages being based on the total weight of said composition and wherein a layer of a pot mix resulting from mixing of said crosslinkable and crosslinking components when applied over a substrate has a brush drag in the range of from 1 to 3 under ASTM test D4958.

2. The brushable coating composition of embodiment 1 wherein said drying oil is linseed oil.

3. The brushable coating composition of embodiment 1 or 2 wherein said drying oil comprises in the range of from about 52% to about 55% of triply unsaturated α-linolenic acid, about 7% to about 8% of palmitic acid and about 3% to about 5% of stearic acid, all weight percentages based on the total weight of linseed oil.

4. The brushable coating composition of any one of the preceding embodiments wherein said polymer is hydroxyl functional (meth)acrylic polymer.

5. The brushable coating composition of embodiment 4 wherein said polymer has a glass transition temperature (Tg) of in a range of from about −40° C. to about 60° C.

6. The coating composition of any one of the preceding embodiments wherein said crosslinker is aliphatic polyisocyanate, cycloaliphatic polyisocyanate aromatic polyisocyanate or a combination thereof.

7. The coating composition of any one of the preceding embodiments wherein a coating upon cure of said layer has a gloss that is in the range of about 80 to about 95 when measured at 60 degree angle.

8. The coating composition of any one of the preceding embodiments comprising one or more organic solvents selected from the group consisting of aromatic hydrocarbons, ketones, esters or a combination thereof.

9. The coating composition of any one of the preceding embodiments wherein said drying oil is in said crosslinkable component, said crosslinking component or in said crosslinkable and crosslinking components.

10. The coating composition of any one of the preceding embodiments, wherein said crosslinkable component and said crosslinking component are stored in separate containers.

11. The coating composition of embodiment 10 wherein said containers are hermetically sealed to prevent exposure to air while stored.

12. The coating composition of any one of the preceding embodiments comprising acrylic non-aqueous dispersed resins.

13. The coating composition of any one of the preceding embodiments, wherein said composition is a refinish automotive paint.

This invention is also directed to a process for producing a coating on a substrate. In the following three embodiments are listed:

1. A process for producing a coating on a substrate comprising:
   (a) mixing a crosslinkable component of a solvent borne coating composition with a crosslinking component of said composition to form a potmix, wherein said crosslinkable component comprises one or more polymers having two or more crosslinkable groups and wherein; said crosslinking component comprises one or more crosslinking agents having crosslinking groups; and said composition comprises about 2 weight percent to about 50 weight percent of drying oil comprising linseed oil, tung oil, poppy seed oil, perilla oil, walnut oil or a combination thereof, said weight percentages being based on the total weight of said composition;

(b) brushing a layer of said potmix over said substrate, wherein said potmix has a brush drag in the range of from 1 to 3 when measured under ASTM test D4958;

(c) curing said layer under ambient conditions to form a coating on said substrate, said coating has a gloss in the range of about from about 80 to about 95 when measured at 60 degrees.

2. The process of embodiment 1, wherein said composition is a refinish automotive paint.

3. The process of embodiment 1 or 2 wherein said substrate is an automotive body.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values. As used herein:

The term "two-pack coating composition", also known as 2K coating composition, refers to a coating composition having two components (crosslinkable and crosslinking components) that are stored in separate containers and hermetically sealed to increase the shelf life of the components of the coating composition during storage and also to prevent exposure to air when stored. The components are mixed just prior to use to form a pot mix, which has a limited pot life, typically ranging from a few minutes (about 15 minutes to about 45 minutes) to a few hours (about 4 hours to about 8 hours). The pot mix is then applied using a brush as a layer of a desired thickness on a substrate surface, such as an automobile body. After application, the layer dries and cures under ambient conditions to form a coating on the substrate surface having desired coating properties, such as, high gloss, mar-resistance and resistance to environmental etching.

The term "crosslinkable component" refers to a component that includes polymers having "crosslinkable functional groups" that are functional groups positioned in each molecule of compounds, oligomer, polymer, the backbone of the polymer, pendant from the backbone of the polymer, terminally positioned on the backbone of the polymer, or a combination thereof, wherein these functional groups are capable of crosslinking with the crosslinking functional groups (during the curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups defined below. A workable combination of crosslinkable functional groups refers to the combinations of crosslinkable functional groups that can be used in coating applications excluding those combinations that would self-crosslink.

Typical crosslinkable functional groups can be selected from hydroxyl, thiol, thioisocyanate, acid or polyacid, acetoacetoxy, carboxyl, primary amine, secondary amine, epoxy, anhydride, ketimine, aldimine, or a combination thereof. Some other functional groups such as orthoester, orther carbonate, or cyclic amide that can generate hydroxyl or amine groups once the ring structure is opened, can also be suitable as crosslinkable functional groups. Hydroxyl groups are preferred.

The term "crosslinking component" refers to a component that includes crosslinking agents having "crosslinking functional groups" that are functional groups positioned in each molecule of monomer, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking group/crosslinkable functional group combinations would be excluded from the present invention, since they would fail to crosslink and produce the film forming crosslinked structures. The crosslinking component can comprise one or more crosslinking agents that have the crosslinking functional groups.

Typical crosslinking functional groups can be selected from the group consisting of hydroxyl, thiol, isocyanate, thioisocyanate, acid or polyacid, acetoacetoxy, carboxyl, primary amine, secondary amine, epoxy, anhydride, ketimine, aldimine, orthoester, orthocarbonate, cyclic amide or a combination thereof. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications.

It would be clear to one of ordinary skill in the art that certain crosslinking functional groups crosslink with certain crosslinkable functional groups. Examples of paired combinations of crosslinkable and crosslinking functional groups include: (1) ketimine functional groups generally crosslink with acetoacetoxy, epoxy, or anhydride functional groups; (2) isocyanate, thioisocyanate and melamine functional groups generally crosslink with hydroxyl, thiol, primary and secondary amine, ketimine, or aldimine functional groups; (3) epoxy functional groups generally crosslink with carboxyl, primary and secondary amine, ketimine, or anhydride functional groups; (4) amine functional groups generally crosslink with acetoacetoxy functional groups; (5) polyacid functional groups generally crosslink with epoxy or isocyanate functional groups; and (6) anhydride functional groups generally crosslink with epoxy and ketimine functional groups.

A substrate suitable for use herein can be a plastic, metal, such as steel, aluminum or other metal or alloys. The substrate can also be plastic or metal substrates with one or more existing coating layers. One example can be a steel substrate coated with an eletrocoat (e-coat) layer. Another example can be a steel substrate coated with an eletrocoat (e-coat) layer and a primer layer. Yet another example can be a steel substrate coated with a primer layer. Yet another example can be a steel substrate coated with a primer layer and a colored coating layer. The primer layer can be produced with an epoxy primer, an acrylic primer, a polyester primer, or other primers known to those skilled in the art. An epoxy primer means a primer composition comprises at least one epoxy resin or its derivatives. An acrylic primer means a primer composition comprises at least one acrylic resin or its derivatives. A polyester primer means a primer composition comprises polyesters or polyester derivatives.

One of the preferred embodiment crosslinkable component contemplated herein can consist essentially of an acrylic polymer having pendant groups that are reactive with isocyanate moieties and having a glass transition temperature (Tg) of about −40° C. to about 60° C.

One of the preferred embodiments of a crosslinking component can consist essentially of a crosslinking agent having one or more isocyanate functional groups that react with said crosslinkable functional groups in the aforedescribed acrylic polymer to form crosslinks.

The coating composition contemplated herein can include a crosslinkable component consisting essentially of about 10% to about 80% by weight, preferably about 20% to about 70% by weight, of the acrylic polymer; and a crosslinking component consisting essentially of about 10% to about 50% by weight and preferably about 10% to about 45% by weight of organic polyisocyanate. All weight percentages are based on the total weight of the binder composition. Preferably, the novel composition has a molar ratio of NCO:OH of about 0.8:1.0 to about 1.5:1.0, preferably about 0.9:1.0 to about 1.1:1.0.

The acrylic polymer used in the composition has a weight average molecular weight (Mw) of about 2,000 to about 100,000, and a glass transition temperature (Tg) in a range of from about −40° C. to about 60° C., preferably about −10° C. to about 30° C., and contains pendant moieties that are reactive with isocyanate groups, such as, hydroxyl, amino, amide, glycidyl, silane and carboxyl groups. The Tg can be measured via a Dynamic Mechanical Analyzer (DMA Q800 from TA Instruments, New Castle, Del.) using ASTM D7028 or the Tg can be calculated according to the Fox Equation. These acrylic polymers can be straight chain polymers, branched polymers, block copolymers, graft polymers, graft terpolymers and core shell polymers.

Preferably, the acrylic polymer can have a weight average molecular weight of about 5,000 to about 50,000, more preferably, about 5,000 to about 25,000 and a Tg in a range of from about −40° C. to about 60° C., preferably less than about 10° C. Typically, useful acrylic polymers can be those known in the art and are polymers of the following: linear alkyl (meth)acrylates having 1 to 12 carbon atoms in the alkyl group, cyclic or branched alkyl(meth)acrylates having 3 to 12 carbon atoms in the alkyl group, including isobornyl(meth) acrylate and the polymers can contain styrene, alpha methyl styrene, vinyl toluene, (meth)acrylonitrile, (meth)acryl amides and contain monomers that provide pendant reactive groups, such as hydroxy alkyl(meth)acrylates having 1 to 4 carbon atoms in the alkyl group, glycidyl(meth)acrylate, amino alkyl(meth)acrylates having 1 to 4 carbon atoms in the alkyl group, (meth)acrylic acid, alkoxy silyl alkyl(meth)acrylates, such as trimethoxysilylpropyl(meth)acrylate.

Preferred are hydroxy functional acrylic polymers having a hydroxy equivalent weight (on a solids basis) of about 300 to about 800, preferably, about 380 to about 750 and more preferably, about 450 to about 580 and are polymers of hydroxy alkyl(meth)acrylates and one or more of the aforementioned monomers. The hydroxyl equivalent weight is the grams of resin per equivalent of hydroxyl groups.

Suitable hydroxyl-functional unsaturated monomers that can be used to introduce hydroxyl groups into the acrylic polymer are, for example, hydroxyalkyl esters of alpha,beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. The hydroxyalkyl esters of (meth)acrylic acid are preferred. Examples of suitable hydroxyalkyl esters of alpha,beta-olefinically unsaturated monocarboxylic acids with primary hydroxyl groups are hydroxyethyl(meth)acrylate, hydroxypropyl(meth)acrylate, hydroxybutyl(meth)acrylate, hydroxyamyl(meth)acrylate, hydroxyhexyl(meth)acrylate. Examples of suitable hydroxyalkyl esters with secondary hydroxyl groups are 2-hydroxypropyl(meth)acrylate, 2-hydroxybutyl(meth)acrylate, 3-hydroxybutyl(meth)acrylate.

Additional useful hydroxy-functional unsaturated monomers are reaction products of alpha,beta-unsaturated monocarboxylic acids with glycidyl esters of saturated monocarboxylic acids branched in alpha position, for example with glycidyl esters of saturated alpha-alkylalkanemonocarboxylic acids or alpha,alpha'-dialkylalkanemonocarboxylic acids. These preferably comprise the reaction products of (meth) acrylic acid with glycidyl esters of saturated alpha,alpha-dialkylalkanemonocarboxylic acids with 7 to 13 carbon atoms per molecule, particularly preferably with 9 to 11 carbon atoms per molecule. These reaction products may be formed before, during or after the copolymerization reaction.

Further usable hydroxy-functional unsaturated monomers are reaction products of hydroxyalkyl(meth)acrylates with lactones. Hydroxyalkyl(meth)acrylates which may be used are, for example, those stated above. Suitable lactones are, for example, those that have 3 to 9 carbon atoms in the ring, wherein the rings may also comprise different substituents. Preferred lactones are gamma-butyrolactone, delta-valerolactone, epsilon-caprolactone, beta-hydroxy-beta-methyl-delta-valerolactone, lambda-laurolactone or mixtures thereof. Epsilon-caprolactone is particularly preferred. The reaction products preferably comprise those prepared from 1 mole of a hydroxyalkyl ester of an alpha,beta-unsaturated monocarboxylic acid and 1 to 5 moles, preferably on average 2 moles, of a lactone. The hydroxyl groups of the hydroxyalkyl esters may be modified with the lactone before, during or after the copolymerization reaction.

Suitable unsaturated monomers that can be used to provide the acrylic polymer with glycidyl groups are, for example, allyl glycidyl ether, 3,4-epoxy-1-vinylcyclohexane, epoxycyclohexyl(meth)acrylate, vinyl glycidyl ether and glycidyl (meth)acrylate. Glycidyl(meth)acrylate is preferably used.

Free-radically polymerizable, olefinically unsaturated monomers which, apart from at least one olefinic double bond, do not contain additional functional groups that can be used to form the acrylic polymer are, for example, esters of unsaturated carboxylic acids with aliphatic monohydric branched or unbranched as well as cyclic alcohols with 1 to 20 carbon atoms. The unsaturated carboxylic acids, which may be considered, are acrylic acid, methacrylic acid, crotonic acid and isocrotonic acid. Esters of (meth)acrylic acid are preferred. Examples of (meth)acrylic acid esters are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of (meth)acrylic acid esters with cyclic alcohols are cyclohexyl acrylate, trimethylcyclohexyl acrylate, 4-tert.-butylcyclohexyl acrylate, isobornyl acrylate and the corresponding methacrylates. Particularly, monomers having inherent low Tg properties are suitable for deriving the low Tg acrylic polymers of this invention. Examples include butyl acrylate (Tg–54° C.), 2-ethylhexyl acrylate (Tg–50° C.), ethyl acrylate (Tg–24° C.), isobutyl acrylate (Tg–24° C.), 2-ethylhexyl methacrylate (–10° C.), and some of the reaction products of long linear or branched alcohols with the olefinically unsaturated monocarboxylic acids. The above-mentioned Tg values are derived from literatures and are commonly accepted in the industry. The Tg's of the acrylic polymers can be conveniently predicted using the Fox equation based on Tgs of the monomers. The compositions of the low Tg acrylic polymers of this invention can be formulated using this tool, and the Tg's of the finished polymers can be measured by DSC (Differential Scanning calorimetry, also available as ASTM D3418/E1356).

Further useful unsaturated monomers that do not contain additional functional groups are, for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers are styrene, alpha-methylstyrene, chlorostyrenes, 2,5-dimethylstyrene, p-methoxystyrene, vinyl toluene. Styrene is preferably used.

Small proportions of olefinically polyunsaturated monomers may also be used. These are monomers having at least 2 free-radically polymerizable double bonds per molecule. Examples of these are divinylbenzene, 1,4-butanediol diacrylate, 1,6-hexanediol diacrylate, neopentyl glycol dimethacrylate, glycerol dimethacrylate.

The hydroxy-functional (meth)acrylic polymers generally are formed by free-radical copolymerization using conventional processes well known to those skilled in the art, for example, bulk, solution or bead polymerization, in particular by free-radical solution polymerization using free-radical initiators.

The acrylic polymer can contain (meth)acrylamides. Typical examples of such acrylic polymers are polymers of (meth) acrylamide and alkyl(meth)acrylates, hydroxy alkyl(meth) acrylates, (meth)acrylic acid and or one of the aforementioned ethylenically unsaturated polymerizable monomers.

The crosslinking agents that can be used in the novel composition of this invention include typical organic polyisocyanates. Examples of organic polyisocyanates include aliphatic polyisocyanates, cycloaliphatic polyisocyanates, aromatic polyisocyanates and isocyanate adducts.

Examples of suitable aliphatic, cycloaliphatic and aromatic polyisocyanates that can be used include the following: 2,4-toluene diisocyanate, 2,6-toluene diisocyanate ("TDI"), 4,4-diphenylmethane diisocyanate ("MDI"), 4,4'-dicyclohexyl methane diisocyanate ("H12MDI"), 3,3'-dimethyl-4, 4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4, 6-toluene triisocyanate. Trimers of diisocyanates, such as, the trimer of hexamethylene diisocyanate, sold as Tolonate® HDT from Rhodia Corporation and the trimer of isophorone diisocyanate are also suitable.

An isocyanate functional adduct can be used, such as, an adduct of an aliphatic polyisocyanate and a polyol or an adduct of an aliphatic polyisocyanate and an amine Also, any of the aforementioned polyisocyanates can be used with a polyol to form an adduct. Polyols, such as, trimethylol alkanes, particularly, trimethylol propane or ethane can be used to form an adduct.

Generally, drying oils are added to alkyd paints. As they tend to rapidly crosslink when exposed to air, they are difficult to apply with a brush at low thicknesses typically employed in automotive refines applications. Moreover, drying oils, such as linseed oils, typically extracted from flax seeds are thickened (Stand Oil) to impart better pigment grinding properties and also to reduce drying time. Thus one of ordinary skill in the art would not employ a drying oil for automotive refinish applications in a brushable enamel because it is too thick.

However, applicants have made a surprising discovery that by adding linseed oil, tung oil, poppy seed oil, perilla oil, walnut oil or a combination thereof to either the crosslinkable component, crosslinking component, or to both of a novel solvent borne brushable coating composition, the brush drag of a layer of a pot mix resulting from mixing of said crosslinkable and crosslinking components when applied over a substrate can be reduced to range of from 1 to 3 as measured under ASTM test D4958 employing compositions of the present invention. Linseed oil that includes in the range of from about 52% to about 55% of triply unsaturated α-linolenic acid, about 7% to about 8% of palmitic acid and about 3% to about 5% of stearic acid, all weight percentages based on the total weight of linseed oil. The more preferred linseed oil includes in the range of from about 18% to about 23% of monounsaturated oleic acid, about 14% to about 17% doubly unsaturated linoleic acid, all weight percentages based on the total weight of linseed oil. Linseed Oil #QL045 supplied by W. M. Barr & Co., of Memphis, Tenn. is well suited for use in the present invention.

Typically, about 2 weight percent to about 50 weight percent, preferably percent about 2 weight percent to about 20 weight percent of drying oil can be added, said weight percentages being based on the total weight of said composition. The drying oil can be added to the crosslinkable component, crosslinking component, or to the crosslinkable and crosslinking components. Since drying oils typically cross link when exposed to air, thus there is an added benefit of lowering the volatile organic component (VOC) of the solvent borne brushable coating composition of the present invention.

The novel composition can contain about 1 to about 50% by weight, preferably, about 20 to about 40% by weight, based on the weight of the binder, of acrylic NAD (non-aqueous dispersed) resins. These NAD resins typically are high molecular weight resins having a crosslinked acrylic core with a Tg between about 20 to about 100° C. and attached to the core are low Tg stabilizer segments. A description of such NAD resins is in Antonelli et al. U.S. Pat. No. 4,591,533, Antonelli et al. U.S. Pat. No. 5,010,140 and in Barsotti et al. U.S. Pat. No. 5,763,528. These patents are hereby incorporated by reference. Clear coating compositions generally do not contain NAD resins.

Typically, a catalyst can be used in the novel composition to reduce curing time and temperature and allow curing of the coating at ambient temperatures. Typical catalysts include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

The novel solvent borne composition is free from water or any alcoholic solvents, such methanol, ethanol, butanol, pentol or glycol. The composition can contain up to about 95% by weight, based on the weight of the coating composition, of one or more solvents. Typically, the novel composition has a solids content of about 20% to about 80% by weight, preferably, about 50% to about 80% by weight and more preferably, about 60% to about 80% by weight of a ready to brush composition. The novel composition may be formulated at 100% solids by using a low molecular weight acrylic resin reactive diluent.

Some of the typical organic solvents may be used to form the coating composition of this invention. Examples of solvents include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof.

Typically, when the novel composition is utilized as a pigmented coating composition, it contains pigments in a pigment to binder weight ratio of about 1/100 to about 350/100. The composition can be used as a primer. Conventional primer pigments can be used in a pigment to binder weight ratio of about 150/100 to about 350/100. Examples of the primer pigments that are useful in primers can include titanium dioxide, zinc phosphate, iron oxide, carbon black, amorphous silica, high surface area silica, barium sulfate, talc, chromate pigments for corrosion resistance, such as, calcium chromate, strontium chromate, zinc chromate, magnesium chromate, barium chromate and hollow glass spheres. The coating composition can also be used as a base-coat or top-coat coating composition. Conventional inorganic and organic colored pigments, metallic flakes and powders, such as, aluminum flake and aluminum powders; special effects pigments, such as, coated mica flakes, coated aluminum flakes colored pigments can be used usually in combination with one of the aforementioned primer pigments. Transparent pigments or pigments having the same refractive index as the cured binder can also be used. Such transparent pigments can be used in a pigment to binder weight ratio of 0.1/100 to 5/100. One example of such transparent pigment is silica.

The novel coating composition can also comprise ultraviolet light stabilizers, or a combination of ultraviolet light stabilizers in the amount of about 0.1% to about 10% by weight, based on the weight of the binder. Examples of such stabilizers include ultraviolet light absorbers, screeners, quenchers, and specified hindered amine light stabilizers. An antioxidant also can be added to the coating composition, in the amount of about 0.1% to about 5% by weight, based on the weight of the binder.

Typical ultraviolet light stabilizers that are suitable for this invention can include benzophenones, triazoles, triazines, benzoates, hindered amines and mixtures thereof. Specific examples of ultraviolet stabilizers are disclosed in Antonelli et al. U.S. Pat. No. 4,591,533, the entire disclosure of which is incorporated herein by reference. For good durability, a blend of Tinuvin® 328 and Tinuvin® 123 (hindered amine light stabilizers), all commercially available from Ciba Specialty Chemicals, Tarrytown, N.Y., under respective registered trademark, is preferred.

Typical ultraviolet light absorbers that are suitable for this invention can include hydroxyphenyl benzotriazoles, such as, 2-(2-hydroxy-5-methylphenyl)-2H-benzotrazole, 2-(2-hydroxy-3,5-di-tert.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4, 6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Typical antioxidants that are suitable for this invention can include tetrakis[methylene(3,5-di-tert-butylhydroxy hydrocinnamate)]methane, octadecyl 3,5-di-tert-butyl-4-hydroxy-hydrocinnamate, tris(2,4-di-tert-butylphenyl)phosphite, 1,3, 5-tris(3,5-di-tert-butyl-4-hydroxybenzyl)-1,3,5-triazine-2,4, 6(1H,3H,5H)-trione and benzenepropanoic acid, 3,5-bis(1,1-dimethyl-ethyl)-4-hydroxy-C7-C9 branched alkyl esters. Typically useful hydroperoxide decomposers include Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals.

Typical hindered amine light stabilizers can include N-(1, 2,2,6,6-pentamethyl-4-piperidinyl)-2-dodecyl succinimide, N(1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N,N'''-dibutyl-N',N'''-bis(1,2,2,6,6-pentamethyl-4-piperidinyl)], poly-[[6-[1,1,3,3-tetramethylbutyl)-amino]-1,3,5-trainmen-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl)methyl]butyl propanedioate, 8-acetyl-3-dodecyl-7,7,9,9,-tetramethyl-1,3,8-triazaspiro(4,5)decane-2,4-dione, dodecyl/tetradecyl-3-(2,2,4,4-tetramethyl-21-oxo-7-oxa-3, 20-diazal dispiro(5.1.11.2)henicosan-20-yl)propionate.

The coating compositions can comprise conventional coating additives. Examples of such additives can include leveling agents based on (meth)acrylic homopolymers, rheological agents, such as highly disperse silica or polymeric urea compounds, thickeners, such as partially cross-linked polycarboxylic acid or polyurethanes, antifoaming agents, wetting agents, catalysts for the cross-linking reaction of the OH—functional binders, for example, organic metal salts, such as, dibutyltin dilaurate, zinc naphthenate and compounds containing tertiary amino groups, such as, triethylamine, for the cross-linking reaction with polyisocyanates. The additives are used in conventional amounts familiar to the person skilled in the art.

The novel coating composition may also contain other conventional formulation additives, such as, wetting agents, leveling and flow control agents, for example, Resiflow®S (polybutylacrylate), BYK® 320 and 325 (high molecular weight polyacrylates), BYK® 347 (polyether-modified siloxane) under respective registered trademarks, and rheology control agents, such as, fumed silica.

The coating compositions according to the invention may contain further reactive low molecular weight compounds as reactive diluents that are capable of reacting with the crosslinking agent. For example, low molecular weight polyhydroxyl compounds, such as, ethylene glycol, propylene glycol, trimethylolpropane and 1,6-dihydroxyhexane may be used.

Aforedescribed additives with the exception of a catalyst can be added to either the crosslinkable component, crosslinking component, or to both. Catalyst is added to the crosslinkable component.

The novel composition is formulated as a two-pack (2K) coating composition. If polyisocyanates with free isocyanate groups are used as the crosslinking agent, the coating composition is formulated as a two-pack system in that the crosslinkable component (first pack) is mixed with the crosslinking component (second pack) shortly before coating application to form pot mix.

The pigments can be dispersed in the first pack using conventional dispersing techniques, such as, ball milling, sand milling, attritor grinding, and the like. The second pack contains the crosslinking agent, such as, a polyisocyanate crosslinking agent, and solvents.

The brushable coating composition according to the invention can be suitable for vehicle and industrial coating and can be applied by using known brushing processes. In the context of vehicle coating, the coating composition can be used both for vehicle original equipment manufacturing (OEM) coating and for repairing or refinishing coatings of vehicles and vehicle parts. Curing of the composition is accomplished at ambient temperatures.

The pot mix of the coating composition can be applied by conventional brushing techniques. Typically, a layer of a pot mix is applied to a dry film thickness of about 20 to about 300 microns and preferably, about 50 to about 200 microns, and more preferably, about 50 to about 130 microns. The layer is cured at ambient temperatures.

The coating composition of this invention forms finishes with good adhesion to the substrates such as blasted steel and other coating layer or layers such as primer layers formed by common industrial primers.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

Testing Procedures

Dry to touch time—Dry to touch time is determined by ASTM D1640.

In the following examples, all parts and percentages are on a weight basis unless otherwise indicated. "Mw" weight average molecular weight and "Mn" means number average molecular weight. "PBW" means parts by weight.

Brush drag is measured under ASTM D4958-10.

Examples

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Procedure 1

Preparation of Acrylic Polymers

Acrylic polymers were formed by free-radical copolymerization using conventional processes well known to those skilled in the art. The process is briefly described here. Charged to a reactor equipped with a stirrer, reflux condenser and under nitrogen 13.7 parts t-butylacetate. Heat to reflux, approximately 96 deg. C. Premixed a monomer mixture of 8.8 parts methyl methacrylate, 5.9 parts styrene, 11.7 parts hydroxyethyl methacrylate, 20.5 parts n-butyl acrylate, 11.7 parts 2-ethylhexyl methacrylate, 1.2 parts t-butylacetate. Premixed an initiator mixture of 3.4 parts Vazo 67 and 23.2 parts t-butylacetate. Fed monomer mixture over 390 minutes at reflux simultaneously with the initiator mixture. Fed initiator mixture over 400 minutes. After the initiator mixture feed was complete, held 30 minutes at reflux. Then cooled to room temperature. The acrylic polymer resin produced had the following characteristics: monomer ratio 10 styrene/35 n-butyl acrylate (nba)/20 ethylhexyl methacrylate (ehma)/15 methyl methacrylate (mma)/20 hydroxyethyl methacrylate (hema), a calculated Tg of 2.2° C., 46.7 wt % solids, Gardner-Holdt viscosity B in Gardner-Holdt Letter scale according to ASTM D1545, and weight average molecular weight (Mw) of 9455.

Procedure 2

Preparation of Pigments Dispersion

A red dispersion was prepared using the following procedure:

TABLE 1

Pigments Dispersion

| Ingrdient | Wt (grams) |
|---|---|
| t-butyl acetate | 72.7 |
| EFKA ®-4340 dispersant[1] | 35.4 |
| Magnesium montmorillonite[2] | 2.3 |
| Acrylic polymer from the Procedure 1 | 211.6 |
| Total | 321.8 |

[1]Available from Ciba ® Specialty Chemicals Inc, Tarrytown, New York, USA, under respective registered trademarks.
[2]Available as Bentone ® 27 from Elementis Specialties Inc., Hightstown, New Jersey, USA, under respective registered trademarks.

Ingredients in Table 1 were added in order to an attritor with mixing and mixed for approximately 5 minutes. The Quinacridone red pigment (Cinquasia red YRT-859-D by Ciba Specialty Chemicals) was slowly added and the mixture was mixed for another 5 minutes. The grinding media containing 1816 grams of ⅛" steel shots were added. The mixture was milled for 5 hours at 350 rpm. The dispersion was separated from the grinding media. The pigment was well dispersed to give a uniform dispersion with a viscosity of 770 cps at 20 rpm as measured by a Brookfield viscometer.

Coating Compositions

Coating compositions were prepared according to the Table 2.

TABLE 2

Coating Compositions (in gram).

| | Comparative 1 | Comparative 2 | Comparative 3 | Example |
|---|---|---|---|---|
| Acrylic polymer[1] | 45 | 40 | 40 | 40 |
| Pigments Dispersion[2] | 35 | 30 | 30 | 30 |
| Linseed oil[3] | — | — | — | 15 |
| Soybean oil[4] | — | — | 15 | — |
| N-butyl acetate[5] | — | 15 | — | — |
| Isocyanates crosslinking agent (FG-1333)[6] | 20 | 15 | 15 | 15 |
| Total | 100 | 100 | 100 | 100 |
| Solid percentage | 65.2% | 59.5% | 66.2% | 66.2% |

[1]Acrylic polymer was from Procedure 1.
[2]Pigments dispersion was from Procedure 2.
[3]Linseed oil #QL045 available from W.M. Barr & Co, Memphis, TN 38113, USA.
[4]Soybean oil from Aldrich Chemical Company, Product No. 47122.
[5]N-butyl acetate from Aldrich Chemical Company, Product No. 287725.
[6]FG-1333 is a crosslinking activator comprising diisocyanates, available from E. I. DuPont de Nemours and Company, Wilmington, DE, USA.

Coating Properties

The coating compositions were applied by drawdown on a steel plate that had been coated with epoxy mastic primer 25P™ (also sold as Corlar® 2.1-PR™) available from E. I. DuPont de Nemours and Company, Wilmington, De, USA, under respective registered and unregistered trademarks. The coating compositions were wet drawdown onto the substrate over the dried primer layer forming a dry film at about 4 mil (about 100 micron) in thickness.

TABLE 3

Coating Properties.

| | Comparative 1 | Comparative 2 | Comparative 3 | Example |
|---|---|---|---|---|
| Dry to touch time (hours) | 3 | 3 | 5 | 2 |
| VOC [lb/gal] | 3.1 | 2.3 | 2.3 | 2.3 |
| Gloss at 60 degrees | 60 | 75 | 65 | 90 |
| Brush Drag[1] | 6 | 5 | 4 | 1 |

[1]ASTM D4958 1—Very slight, 2—Slight, 3—Slight to moderate, 4—Moderate, 5—moderate to considerable From Table 3 one can readily note that increasing the amounts of polymer in crosslinkable component and crosslinking agent in crosslinking component as in Comparative 1, adding extra solvent (Comparative 2), adding other types vegetable drying oils, such as Soybean oil (Comparative 3) reduce the brush drag. Applicants have made a surprise discovery that only when linseed oil is used, desired coating properties, such as higher gloss and lowered dry to touch time are attained while significantly reducing the brush drag. Applicants surprising discovery was the reduction in dry to touch time, since most of the drying oils, such as linseed oils are well known to have tacky touch for a very long time since the crosslinking continues to occur a long periods of time. Therefore, one of ordinary skill in the art would not have expected linseed oil to attain faster dry time while reducing brush drag.

What is claimed is:

1. A solvent borne brushable coating composition comprising:

(a) a crosslinkable component comprising one or more polymers having two or more crosslinkable groups;

(b) a crosslinking component comprising one or more crosslinking agents having crosslinking groups; and (c) about 2 weight percent to about 50 weight percent of drying oil comprising linseed oil, tung oil, poppy seed oil, perilla oil, walnut oil or a combination thereof added to said crosslinkable component, crosslinking component, or to said crosslinkable and crosslinking components, said weight percentages being based on the total weight of said composition and wherein a layer of a pot mix resulting from mixing of said crosslinkable and crosslinking components when applied over a substrate has a brush drag in the range of from 1 to 3 under ASTM test D4958.

2. The brushable coating composition of claim 1 wherein said drying oil is linseed oil.

3. The brushable coating composition of claim 1 wherein said drying oil comprises in the range of from about 52% to about 55% of triply unsaturated α-linolenic acid, about 7% to about 8% of palmitic acid and about 3% to about 5% of stearic acid, all weight percentages based on the total weight of drying oil.

4. The brushable coating composition of claim 1 wherein said polymer is hydroxyl functional (meth)acrylic polymer.

5. The brushable coating composition of claim 4 wherein said polymer has a glass transition temperature (Tg) of in a range of from about −40° C. to about 60° C.

6. The coating composition of claim 1 wherein said crosslinker is aliphatic polyisocyanate, cycloaliphatic polyisocyanate, aromatic polyisocyanate or a combination thereof.

7. The coating composition of claim 1 wherein a coating upon cure of said layer has a gloss that is in the range of about 80 to about 95 when measured at 60 degree angle.

8. The coating composition of claim 1 comprising one or more organic solvents chosen from aromatic hydrocarbons, ketones, esters and a combination thereof.

9. The coating composition of claim 1, wherein said crosslinkable component and said crosslinking component are stored in separate containers.

10. The coating composition of claim 9 wherein said containers are hermetically sealed to prevent exposure to air while stored.

11. The coating composition of claim 1 comprising acrylic non-aqueous dispersed resins.

12. The coating composition of claim 1, wherein said composition is a refinish automotive paint.

13. A process for producing a coating on a substrate, wherein the process comprises the steps of:
    (a) mixing a crosslinkable component of a solvent borne coating composition with a crosslinking component of said composition to form a potmix, wherein said crosslinkable component comprises one or more polymers having two or more crosslinkable groups and wherein; said crosslinking component comprises one or more crosslinking agents having crosslinking groups; and said composition comprises about 2 weight percent to about 50 weight percent of drying oil comprising linseed oil, tung oil, poppy seed oil, perilla oil, walnut oil or a combination thereof, said weight percentages being based on the total weight of said composition;
    (b) brushing a layer of said potmix over said substrate, wherein said potmix has a brush drag in the range of from 1 to 3 when measured under ASTM test D4958;
    (c) curing said layer under ambient conditions to form a coating on said substrate, said coating has a gloss in the range of about from about 80 to about 95 when measured at 60 degrees.

14. The process of claim 13, wherein said composition is a refinish automotive paint.

15. The process of claim 13 wherein said substrate is an automotive body.

* * * * *